United States Patent
Lindner

(10) Patent No.: US 7,139,079 B2
(45) Date of Patent: Nov. 21, 2006

(54) INTERFEROMETRIC MEASURING DEVICE

(75) Inventor: Michael Lindner, Leutenbach (DE)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 10/297,559

(22) PCT Filed: Mar. 16, 2002

(86) PCT No.: PCT/DE02/00967

§ 371 (c)(1),
(2), (4) Date: Apr. 16, 2003

(87) PCT Pub. No.: WO02/082007

PCT Pub. Date: Oct. 17, 2002

(65) Prior Publication Data

US 2003/0160965 A1     Aug. 28, 2003

(30) Foreign Application Priority Data

Apr. 9, 2001    (DE) ................. 101 17 658

(51) Int. Cl.
G01B 11/02     (2006.01)
G01B 9/02      (2006.01)

(52) U.S. Cl. .................... 356/497; 356/479

(58) Field of Classification Search ........ 356/477, 356/479, 497; 250/227.19, 227.27; 385/12
See application file for complete search history.

(56) References Cited

U.S. PATENT DOCUMENTS 4,234,254 A    11/1980   Dreisbach et al.
4,541,717 A     9/1985   Itamato et al.
4,596,466 A *   6/1986   Ulrich ................. 356/497
5,689,337 A    11/1997   Lamb et al.
6,661,522 B1*  12/2003   Ouchi ................. 356/515
6,813,029 B1*  11/2004   Lindner et al. ....... 356/497

FOREIGN PATENT DOCUMENTS

DE    41 08 944     9/1992
DE    197 21 842   12/1998
DE    197 21 843   12/1998

OTHER PUBLICATIONS

De Groot, P., et al., "Surface Profiling by Analysis of White-Light Interferograms in the Spatial Frequency Domain," J. Mod. Opt., vol. 42, No. 2, 389-401, 1995.
Maak, T., et al., "Endoskopisches 3D-Formmesssysten [Endocospic 3D Mold Measuring System]," Jahrbuch Für Optik und Feinmechanik [Yearbook for Optics and Precision], W.D. Prenzel, ed., Verlag Schiele & Schoen, Berlin 231-240, 1998.

* cited by examiner

Primary Examiner—Hwa (Andrew) Lee
Assistant Examiner—Michael A. Lyons
(74) Attorney, Agent, or Firm—Kenyon & Kenyon LLP

(57) ABSTRACT

An interferometric measuring device for measuring a surface or an interface of an object to be measured is provided. The effect of vibration on the measurement result is suppressed by providing a connecting unit by which at least one section of the measuring device assigned to the object to be measured is mechanically rigidly and detachably connectable directly to the object to be measured.

15 Claims, 3 Drawing Sheets

INTERFEROMETRIC MEASURING DEVICE

FIELD OF THE INVENTION

The present invention relates to an interferometric measuring device for measuring a surface or an interface of an object to be measured.

BACKGROUND INFORMATION

An interferometric measuring device is discussed in German Patent No. 197 21 843. This interferometric measuring device is designed as a white light interferometer measuring device having a section designed as a modulation interferometer and a section designed as an imaging interferometer assigned to the object to be measured. The imaging interferometer is designed so that measurements may be performed even in tight spaces. A first partial beam may be further divided into a reference partial beam and at least one measuring partial beam, another beam splitter and a reference mirror being situated in a common measuring probe. Such a measuring probe may be inserted into hollow spaces. However, if vibration occurs during a measurement in a manufacturing process, the measurement result may be inaccurate due to vibration of the measuring device and/or the object to be measured.

The principles of white-light interferometry or short-coherence interferometry are discussed, for example, by P. de Groot, L. Deck, "Surface profiling by analysis of white-light interferograms in the spatial frequency domain," J. Mod. Opt., Vol. 42, No. 2, 389–401, 1995, and T. Maack, G. Notni, W. Schreiber, W. D. Prenzel, "Endoskopisches 3D-Formmesssystem [Endoscopic 3D Mold Measuring System]" in Jahrbuch für Optik und Feinmechanik [Yearbook for Optics and Precision Mechanics], W. D. Prenzel, ed., Verlag Schiele & Schoen, Berlin 231–240, 1998.

Furthermore, the design of an interferometric measuring device is also discussed in German Patent No. 197 21 843. In the case of this measuring device, a radiation generating unit, e.g., an LED or a superluminescence diode, emits a short-coherent radiation which is split by a beam splitter into a first partial beam, which is sent via an object light path, and a second partial beam which is sent via a reference light path. The reference light path is varied periodically by two deflector elements and a stationary diffraction grating situated behind it by triggering the deflector elements to scan the object surface in the depth direction. If the object light path and the reference light path correspond, the result may be a maximum interference contrast, which is detected by an analyzer device downstream from the photodetector device.

Another white-light interferometer measuring device is discussed in German Published Patent Application No. 41 08 944 A1, in which a moving mirror is used to change the light path in the reference beam path. Even with these methods, it is possible that vibration of the measuring device and/or the object to be measured will affect the measurement result.

SUMMARY

An exemplary embodiment of the present invention may provide an interferometric measuring device with which the effects of vibration on the measuring device and/or the object to be measured on the measurement result may be substantially ruled out.

A connecting unit is provided by which at least one section of the measuring device assigned to the object to be measured is mechanically rigidly and detachably connectable directly to the object to be measured.

Due to the mechanically rigid connection between the object to be measured and the interferometric measuring device, any movement during vibration may be transferred about equally to the measuring device and the object to be measured, so that the vibration does not lead to distortion of the measurement result. A mechanical adaptation between the object to be measured and the measuring device is established through the connecting unit for the measurement operation. Thereafter, the connection may be released and a mechanically rigid link may be established to the downstream object to be measured, e.g., to perform a quality check in mass production.

Various exemplary embodiments include the connecting unit being formed by a plug connection, a clamp connection, a chucking connection, a catch connection, a clip connection, or a screw connection.

It may be possible to use these measures for vibration compensation in various interferometric measuring devices, e.g., in classic interferometry and in 2-wavelength interferometry with a corresponding design for the data acquisition.

In an exemplary embodiment of the interferometric measuring device, it may be designed as a white-light interferometer measuring device having an object light path and a reference light path, and at least the reflecting reference plane may be connectable to the object to be measured via the connecting unit.

A compact design is achieved by the fact that the object light path and the reference light path form a rigid interconnected unit having an object arm and a reference arm.

If the white-light interferometer has a modulation interferometer and an imaging interferometer assigned to the object, this yields a simplified operation, because the modulation interferometer, which is usually more complex, together with the device for altering the light path, is separate from the imaging interferometer, which is assigned to the object to be measured and has a simple and rugged design accordingly and may be adapted to the particular measurement task.

A design which may be advantageous for handling may include, for example, a short-coherent radiation-emitting radiation generating unit and a beam splitter for forming a first partial beam and a second partial beam. For the measurement, the optical path length of the first partial beam may be varied relative to the optical path length of the second partial beam, the first partial beam formed by the beam splitter being directed first to a stationary first mirror over a first arm, while the second partial beam is directed to the reflecting element via a second arm. The optical path difference between the first arm and the second arm may be greater than the coherence length of the radiation. The radiation, coming from the first mirror and the reflecting element and being jointly forwarded, is directed in part to the object to be measured via an object light path and in part to a reference mirror via the reference light path using an additional beam-splitter. The reference mirror may be situated at such a distance from the object to be measured that the path difference between the first mirror and the reflecting element is eliminated. The radiation striking the reference mirror and the radiation directed to the object to be measured may be reflected, superimposed and detected by a photodetector device having an image pickup.

A favorable design for handling includes the reference light path being formed in a separate reference arm or in an optical probe through which the radiation directed to the object to be measured is also directed. The reference mirror may reflect the part of the radiation belonging to the reference light path and may allow the part of the radiation belonging to the object light path to pass through.

A simple measurement of different measurement surfaces is made possible by the fact that at least one optical element and/or the elements shaping the wave front of the radiation are situated in the object light path.

If an optical probe having an optical arrangement is provided in the object light path for generating at least one intermediate optical image, this permits a high lateral resolution of the measurement surface, as discussed in German Patent Application No. 100 47 495.

Alternative exemplary embodiments include the fact that the at least one intermediate image is generated in the object light path, and both the radiation leading to the object to be measured and the radiation coming back from it pass through the optical probe.

An alternative exemplary embodiment may provide the reference mirror on a flat plate or a prism.

It may be advantageous for handling that fiber optics are situated between the beam splitter and the additional beam splitter.

For the design and operation, other advantages may be achieved by providing an endoscope in the object light path for generating the intermediate image.

Additional possible exemplary embodiments include providing panorama optics or superpositioning optics in the object light path and having multiple reference planes for scanning different measurement surfaces.

DETAILED DESCRIPTION

Figure 1:
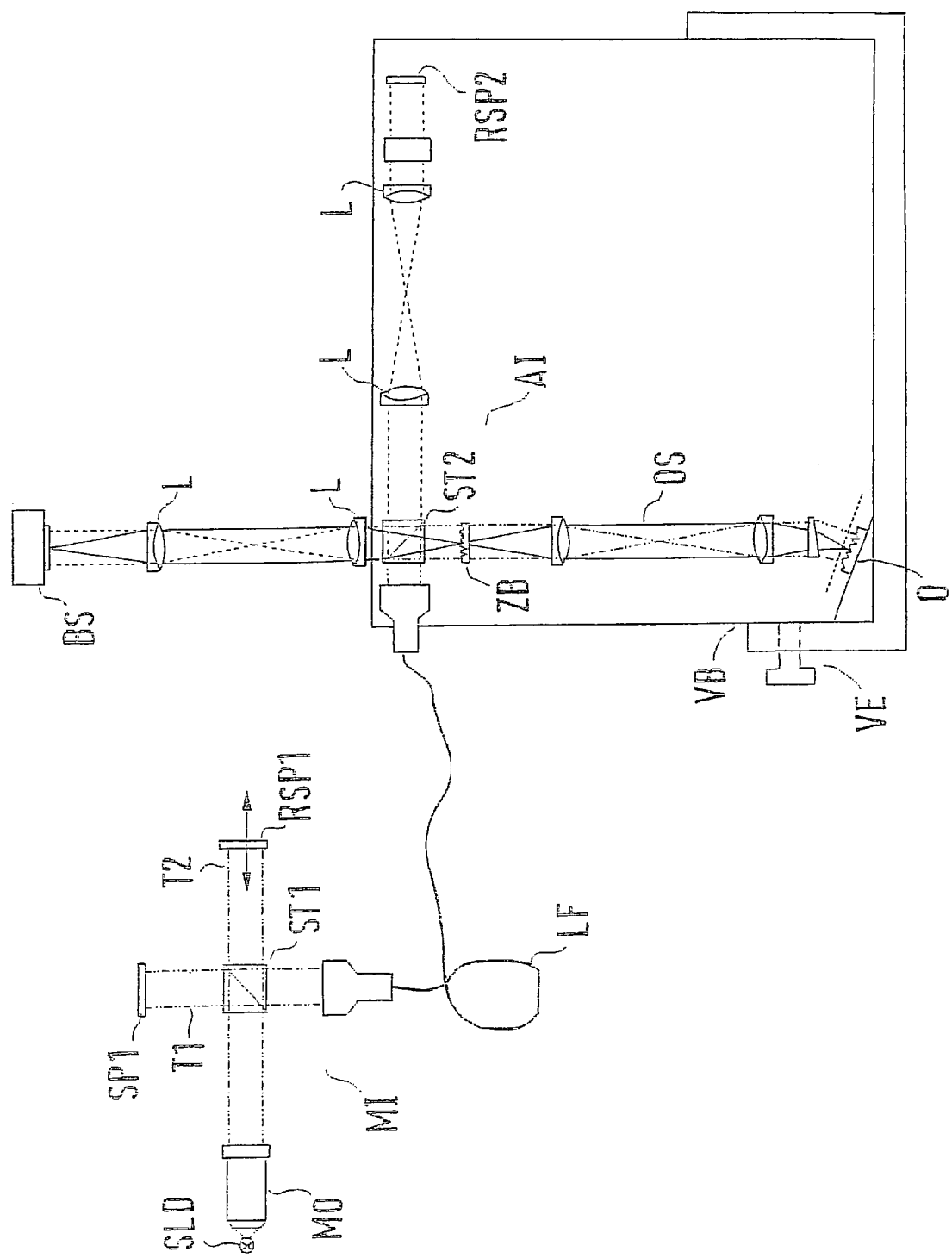
FIG. 1 shows a first exemplary embodiment of an interferometric measuring device having a modulation interferometer and an imaging interferometer rigidly connected to an object.

FIG. 1 shows an interferometric measuring device having a modulation interferometer MI at a distance from an object O to be measured and an imaging interferometer AI assigned to object O. Modulation interferometer MI has a radiation generating unit SLD which emits a short-coherent, i.e., broadband radiation, e.g., an LED or a superluminescence diode whose radiation is split by a beam splitter ST1 into a first partial beam T1 of a first arm and a second partial beam T2 of a second arm. This design corresponds to a Michelson interferometer. In the second arm, second partial beam T2 is reflected by a reference plane in the form of a reference mirror RSP1, the second arm being varied periodically, e.g., by moving reference mirror RSP1 or by acousto-optic deflectors, such as those discussed in German Patent No. 197 21 842. If the change in the light path is performed with two acousto-optic deflectors, a mechanically moving reflecting element may be unnecessary, and a stationary element, in particular a grating, may be used instead.

The optical path difference between the arms thus formed is greater than the coherence length of the radiation generated by radiation generating unit SLD. From the two mirrors SP1 and RSP1, the reflected radiation is sent to the imaging interferometer via beam splitter ST1, fiber optics LF, and another beam splitter ST2.

An object light path having an optical probe OS and a reference light path having another reference mirror RSP2 are formed in imaging interferometer AI, which is also designed as a Michelson interferometer.

In the object light path, radiation is input into optical probe OS, so that radiation illuminates the surface to be measured of an object O to be measured. Through optical probe OS, the object surface is imaged on a photodetector device in the form of an image converter and/or image sensor BS, e.g., a CCD camera, via one or more intermediate images ZB. The reference wave of the second partial beam of the reference light path is superimposed on the image of object O to be measured on image sensor BS. A high interference contrast occurs in the image of object O to be measured when a path difference between the reference light path and the measurement light path is less than the coherence length.

The measurement principle is based on white-light interferometry (short-coherence interferometry). The length of the reference light path is varied by moving mirror RSP1 in the second arm of modulation interferometer MI for scanning in the depth direction of the surface to be measured over the entire measurement range, the length of the reference light path at which the highest interference contrast occurs being detected for each measurement point. The intermediate images make it possible to image the surface of the object to be measured with a high lateral resolution over a distance which is great in comparison with the diameter of the imaging optics. Optical probe OS resembles an endoscope or a borescope, but the illumination and the return of the radiation coming from the surface to be measured are accomplished with the same optical arrangement using at least one intermediate image. FIG. 1 shows a few lenses L schematically as additional imaging elements. The actual intermediate images are generated in optical probe OS.

For applications which require a precise compensation of the influence of the imaging lenses of optical probe OS, the same optical probe may also be integrated into the reference light path between beam splitter ST2 and reference mirror RSP2 as into the object light path between beam splitter ST2 and object O to be measured.

Figure 2:
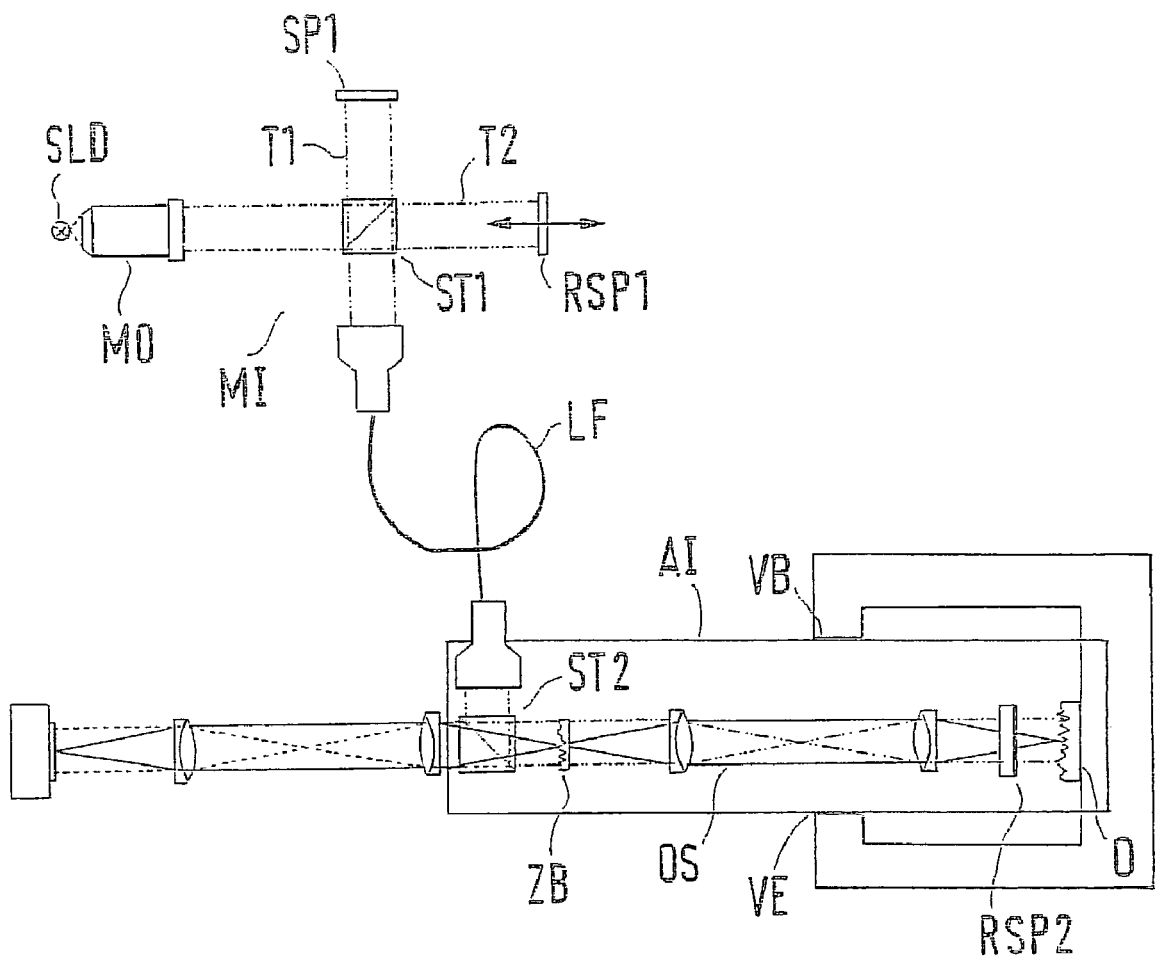
FIG. 2 shows an exemplary embodiment in which the imaging interferometer has a common-path design and is rigidly connected to the object.
Figure 3:
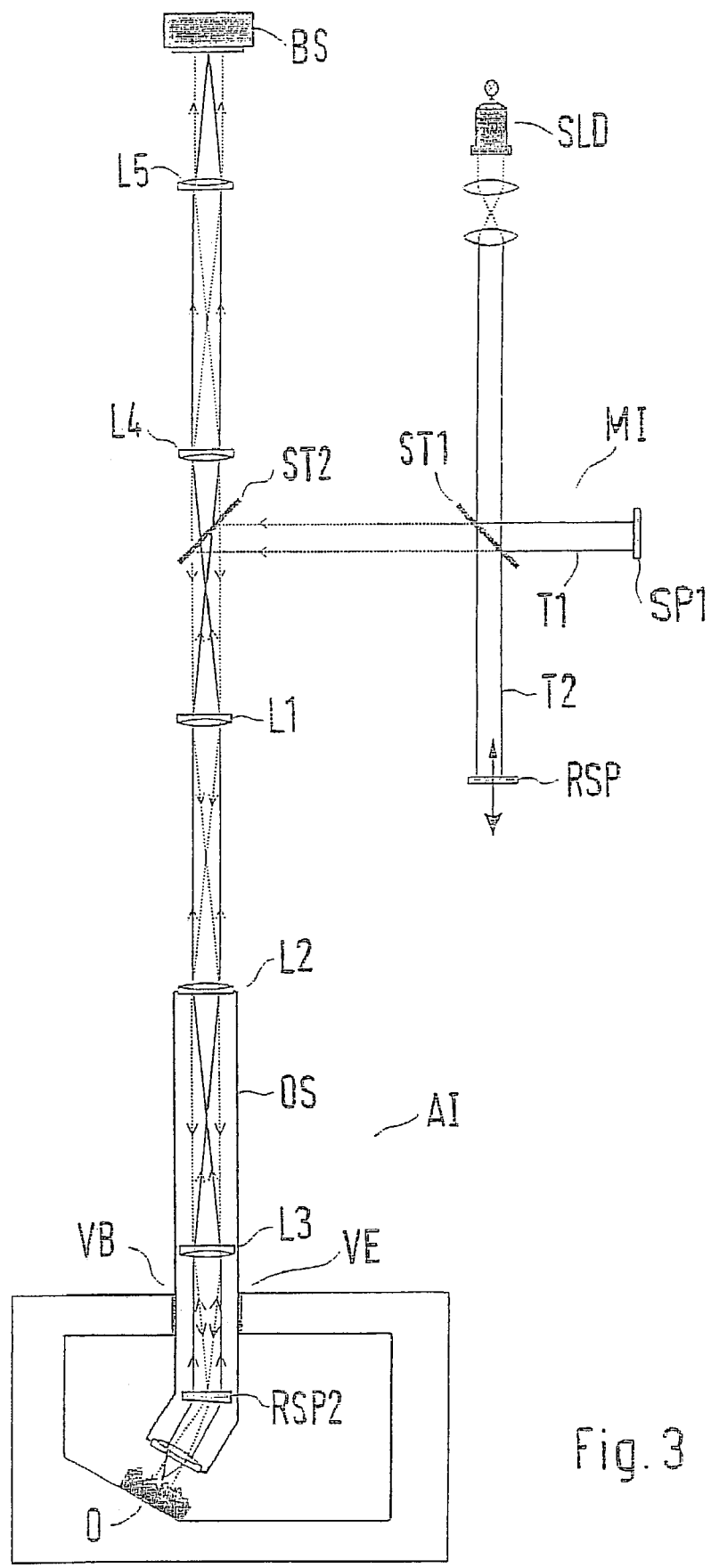
FIG. 3 shows an exemplary embodiment of the interferometric measuring device having a common reference light path and measurement light path (common-path design).

The interferometric measuring device may be implemented in a modified design according to FIGS. 2 and 3, namely imaging interferometer AI and an arrangement having a common reference arm and measurement arm (common-path arrangement). The interferometric measuring device is in turn illuminated with a short-coherent (broadband) radiation generating unit. Beam splitter ST1 splits the light into first partial beam T1 and second partial beam T2, first partial beam T1 striking first stationary mirror SP1 and second partial beam T2 striking reflecting element RSP1 in the form of the reference mirror.

The optical path difference between the arms thus formed is in turn greater than the coherence length of the radiation generated by radiation generating unit SLD. From the two mirrors SP1 and RSP1, the reflected radiation is sent to optical probe OS via beam splitter ST1 and another beam splitter ST2. In this design, a reference mirror RSP2 is situated in the object light path and/or in optical probe OS itself.

A portion of the radiation is reflected on this reference mirror RSP2, while the other portion of the radiation illuminates the surface to be measured. Reference mirror RSP2 may be applied to a flat plate or to a prism. By using a prism, it is possible to adapt the wave front of the radiation illuminating the object surface, i.e., the object wave, to the geometry (e.g., the inclination) of the surface to be measured. Object O to be measured is in turn imaged on image sensor BS via one or more intermediate images by using optical probe OS and the reference wave is superimposed on it. To obtain height information, reflecting element RSP1 is moved over the measurement area, or the light path is varied as discussed in German Patent No. 197 21 842. A high interference contrast occurs in the image of object O to be measured when the path difference between stationary mirror SP1 and reflecting element RSP1, i.e., the light paths of the two arms, is equal to the optical path difference between reference mirror RSP2 and object O to be measured. Methods of detecting the highest interference contrast in each pixel may be used to obtain the 3D height profile. This design may have the advantage that the object wave and the reference wave pass through virtually identical optics, so that aberrations are mostly compensated. Furthermore, this arrangement may be even more rugged with respect to mechanical vibration.

For even simpler handling of the measuring device, the radiation of beam splitter ST1 may also be transmitted via fiber optics LF to the other beam splitter ST2, as illustrated in FIG. 2. As an alternative, a free-beam design may also be selected.

With the designs described here, imaging interferometer AI is designed as a rigid mechanical unit, at least in the section of the object light path and the reference light path, and during the measurement this mechanical unit is rigidly and detachably connected directly to object O to be measured by a connecting unit VE in a connecting area VB. For example, a screw connection having a union nut, a screw section of imaging interferometer AI which can be screwed into a threaded hole in object O to be measured, a plug connection, a catch connection, a clip connection, a clamp connection, or a chucking connection is provided as the connecting unit. If a common-path design is selected, the object light path, i.e., the object arm, and the reference light path, i.e., the reference arm, may be introduced jointly into object O to be measured.

What is claimed is:

1. An interferometric measuring device for measuring a surface of an object to be measured or an interface of an object to be measured, comprising:
    a connecting unit adapted to directly, mechanically rigidly, and detachably connect at least one section of the measuring device and the object to be measured, wherein the measuring device is a white-light interferometer device including an object light path and a reference light path, and wherein at least a reflecting reference plane is connectable to the object to be measured using the connecting unit.

2. The measuring device as recited in claim 1, wherein the connecting unit includes one of a plug connection, a clamp connection, a chucking connection, a catch connection, a clip connection, and a screw connection.

3. The measuring device as recited in claim 1, wherein the object light path and the reference light path form a rigid, interconnected unit including an object arm and a reference arm.

4. The measuring device as recited in claim 1, wherein the white-light interferometer measuring device includes a modulation interferometer and an imaging interferometer assigned to the object to be measured.

5. The measuring device as recited in claim 1, further comprising:
    a short-coherent, radiation-emitting radiation generating unit; and
    a beam splitter for forming a first partial beam and a second partial beam;
    wherein for a measurement, a first optical path length of the first partial beam is varied relative to a second optical path length of the second partial beam;
    wherein the first partial beam formed by the beam splitter is directed first to a stationary, first mirror, over a first arm, while the second partial beam is directed to a reflecting element over a second arm;
    wherein an optical path difference between the first arm and the second arm is greater than a coherence length of a radiation;
    wherein a jointly-transmitted radiation coming from the first mirror and the reflecting element is directed in a first radiation part to the object to be measured, via an object light path, using another beam splitter, and in a second radiation part to a reference mirror via a reference light path;
    wherein the reference mirror is situated at a distance from the object to be measured so that a path difference between the first mirror and the reflecting element is eliminated; and
    wherein the second radiation part striking the reference mirror and the first radiation part directed to the object to be measured is reflected, superimposed, and detected by a photo detector device including an image pickup.

6. The measuring device as recited in claim 5, wherein:
    the reference light path is formed in one of a separate reference arm and an optical probe, the first radiation part directed to the object to be measured being also directed through the reference light path, the reference mirror reflecting the second radiation part corresponding to the reference light path and allowing the first radiation part corresponding to the object light path to pass substantially unreflected.

7. The measuring device as recited in claim 6, wherein the reference mirror is provided on one of a flat plate and a prism.

8. The measuring device as recited in claim 5, wherein at least one optical element shaping a wave front of the radiation is situated in the object light path.

9. The measuring device as recited in claim 5, wherein fiber optics are situated between the beam splitter and the other beam splitter.

10. The measuring device as recited claim 1, wherein an optical probe including an optical arrangement is provided in the object light path for generating at least one intermediate optical image.

11. The measuring device as recited in claim 10, wherein the at least one intermediate optical image is generated in the object light path.

12. The measuring device as recited in claim 10, wherein a radiation leading to the object to be measured and a further radiation coming back from the object to be measured pass through the optical probe.

13. The measuring device as recited in claim 11, wherein an endoscope is situated in the object light path for generating the at least one intermediate optical image.

14. The measuring device as recited in claim 1, wherein one of panorama optics and superpositioning optics are situated in the object light path.

15. The measuring device as recited claim 1, wherein the measuring device includes a plurality of reference planes for scanning a plurality of different measurement surfaces.

* * * * *